United States Patent
Carbune et al.

(10) Patent No.: US 11,683,320 B2
(45) Date of Patent: Jun. 20, 2023

(54) DISTRIBUTED IDENTIFICATION IN NETWORKED SYSTEM

(71) Applicant: Google LLC, Mountain View, CA (US)

(72) Inventors: Victor Carbune, Zurich (CH); Thomas Deselaers, Zurich (CH); Sandro Feuz, Zurich (CH)

(73) Assignee: GOOGLE LLC, Mountain View, CA (US)

(*) Notice: Subject to any disclaimer, the term of this patent is extended or adjusted under 35 U.S.C. 154(b) by 166 days.

(21) Appl. No.: 17/237,573

(22) Filed: Apr. 22, 2021

(65) Prior Publication Data
US 2021/0243200 A1    Aug. 5, 2021

Related U.S. Application Data

(63) Continuation of application No. 16/063,128, filed as application No. PCT/US2017/065460 on Dec. 8, 2017, now Pat. No. 10,992,684.

(51) Int. Cl.
*H04L 9/40* (2022.01)
*G10L 15/22* (2006.01)
(Continued)

(52) U.S. Cl.
CPC ............ *H04L 63/107* (2013.01); *G06F 3/167* (2013.01); *G06F 9/5055* (2013.01); *G06F 16/635* (2019.01); *G06F 21/32* (2013.01); *G10L 15/22* (2013.01); *G10L 17/00* (2013.01); *H04L 63/0861* (2013.01); *H04L 67/12* (2013.01);
(Continued)

(58) Field of Classification Search
CPC ....... H04L 63/107; H04L 67/30; H04L 67/12; H04L 63/0861; G10L 2015/227; G10L 15/22
See application file for complete search history.

(56) References Cited

U.S. PATENT DOCUMENTS 9,626,970 B2    4/2017  Huang et al.
9,674,700 B2 *  6/2017  John Archibald .... H04W 12/50
(Continued)

FOREIGN PATENT DOCUMENTS

CN    106164921    11/2016
EP    2727104      5/2014
(Continued)

OTHER PUBLICATIONS

Korean Patent Office; Office Action issued in Application No. KR10-2022-7014095; 6 pages; dated May 2, 2022.
(Continued)

*Primary Examiner* — Brian L Albertalli
(74) *Attorney, Agent, or Firm* — Gray Ice Higdon

(57) ABSTRACT

The present disclosure is generally directed to a data processing system for customizing content in a voice activated computer network environment. With user consent, the data processing system can improve the efficiency and effectiveness of auditory data packet transmission over one or more computer networks by, for example, increasing the accuracy of the voice identification process used in the generation of customized content. The present solution can make accurate identifications while generating fewer audio identification models, which are computationally intensive to generate.

18 Claims, 4 Drawing Sheets

(51) Int. Cl.

| | |
|---|---|
| H04L 67/12 | (2022.01) |
| H04L 67/30 | (2022.01) |
| G06F 16/635 | (2019.01) |
| G06F 3/16 | (2006.01) |
| G10L 17/00 | (2013.01) |
| G06F 21/32 | (2013.01) |
| G06F 9/50 | (2006.01) |
| G10L 15/30 | (2013.01) |

(52) U.S. Cl.
CPC ...... *H04L 67/30* (2013.01); *G06F 2221/2111* (2013.01); *G10L 15/30* (2013.01); *G10L 2015/226* (2013.01); *G10L 2015/227* (2013.01)

(56) References Cited

U.S. PATENT DOCUMENTS

| | | |
|---|---|---|
| 9,892,732 B1 | 2/2018 | Tian et al. |
| 10,027,662 B1 | 7/2018 | Mutagi et al. |
| 10,405,163 B2* | 9/2019 | Goldstein ......... H04M 1/72412 |
| 10,992,684 B2 | 4/2021 | Carbune et al. |
| 2008/0082332 A1* | 4/2008 | Mallett .................. G10L 15/30 704/E15.047 |
| 2012/0249328 A1 | 10/2012 | Xiong |
| 2015/0082404 A1 | 3/2015 | Goldstein |
| 2015/0162004 A1 | 6/2015 | Goesnar et al. |
| 2015/0255068 A1 | 9/2015 | Kim et al. |
| 2015/0278348 A1 | 10/2015 | Paruchuri et al. |
| 2016/0019889 A1 | 1/2016 | Alvarez Guevara et al. |
| 2016/0127900 A1 | 5/2016 | Archibald et al. |
| 2016/0234206 A1 | 8/2016 | Tunnell et al. |
| 2016/0286393 A1 | 9/2016 | Rasheed et al. |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0185669 A1 | 6/2017 | Chang et al. |
| 2017/0237801 A1 | 8/2017 | Baluja et al. |
| 2017/0358301 A1 | 12/2017 | Raitio et al. |
| 2018/0293989 A1 | 10/2018 | De et al. |
| 2019/0080698 A1* | 3/2019 | Miller ..................... G10L 17/22 |
| 2019/0182176 A1* | 6/2019 | Niewczas ............... G10L 17/24 |
| 2019/0311721 A1 | 10/2019 | Edwards |

FOREIGN PATENT DOCUMENTS

| | | |
|---|---|---|
| EP | 3129982 | 2/2017 |
| KR | 20160143680 | 12/2016 |

OTHER PUBLICATIONS

The Korean Intellectual Property Office; Notice of Office Action issued in Application No. 10-2020-7018444; 12 pages; dated Aug. 29, 2021.
Japanese Patent Office; Notice of Reasons for Rejection issued in Application No. 2020531004; 11 pages dated Aug. 16, 2021.
European Patent Office; Intention to Grant issued in Application No. 17826345.5, 54 pages, dated Aug. 9, 2022.
The Korean Intellectual Property Office; Notice of Allowance issued in Application No. 10-2020-7018444; 3 pages; dated Feb. 25, 2022.
Japanese Patent Office; Notice of Allowance issued in Application No. 2020-531004, 3 pages, dated Apr. 4, 2022.
European Patent Office; International Search Report and Written Opinion of PCT Ser. No. PCT/US2017/065460; 14 pages; dated Aug. 1, 2018.
"Walmart and Google to offer voice-enabled shopping", BBC New, Aug. 23, 2017 10 pages.
Abrams, Help users find, interact & re-engage with your app on the Google Assistant, Google Developers Blog, Nov. 15, 2017. 16 pages.
Albrecht, "Alexa, How Can You Be Used in Restaurants?", the spoon, Dec. 10, 2017. 6 pages.
Amazon, "Echo Look Hands-Free Camera and style Assistant", reprinted from https://www.amazon.com/gp/product/BO186JAEWK/ref%5F=cm%5Fsw%5Fr%5Ffa%5Fdp%5ft2%5FC5oazbJTKCB18&pldnSite=1. Aug. 22, 2017. 7 pages.
Barr, "AWS DeepLens—Get Hands-On Experience with Deep Learning With Our New Video Camera", AWS News Blog, Nov. 29, 2017. 11 pages.
Broussard, Mitchel, "Chatbot-Like Siri Patent Includes Intelligent Image, Video, and Audio Recognition within Messages", MacRumors, May 11, 2017. 7 pages.
Buckland et al., "Amazon's Alexa Takes Open-Source Route to Beat Google Into Cars", Bloomberg, Feb. 27, 2018. 6 pages.
Chen, Lulu Yilun, "Alibaba Challenges Google, Amazon With New Echo-Like Device", Bloomberg Technology, Jul. 5, 2017. 3 pages.
Clover, Juli, "Amazon and Google Want to Turn Their Smart Home Speakers Into Telephone Replacements", MacRumors, Feb. 15, 2017. 5 pages.
Coberly, "Apple patent filing reveals potential whispering Siri functionality", Techspot, Dec. 14, 2017. 4 pages.
Collins, et al., "Can Twitter Save Itself?", cnet, Apr. 26, 2017, reprinted from https://www.cnet.com/news/twitter-q1-2017-earnings/ Aug. 22, 2017. 2 pages.
Crist, Ry, "Logitech Harmony's Alexa Skill just got a whole lot better", cnet, Jul. 13, 2017. 2 pages.
Estes, "Amazon's Newest Gadget Is a Tablet That's Also an Echo", Gizmodo, Sep. 19, 2017. 3 pages.
Foghorn Labs, 10 Tips to Improve the Performance of Google Product Listing Ads, printed from Internet address http://www.foghornlabs.com/2012/11/21/product-listing-ads-best-practices/ Mar. 18, 2013. 5 pages.
Forrest, Conner, "Essential Home wants to be bridge between Amazon's Alexa, Apple's Siri, and Google Assistant", TechRepublic, May 31, 2017. 10 pages.
Foxx, Chris, "Apple reveals HomePod smart speaker", BBC News, Jun. 5, 2017. 6 pages.
Gebhart, Andrew, "Google Assistant is spreading, but it needs its own Echo Dot", cnet, May 20, 2017. 7 pages.
Gebhart, Andrew, "Google Home to the Amazon Echo: 'Anything you can do . . . ", cnet, May 18, 2017. 7 pages.
Gibbs, Samuel, "Your Facebook Messenger app is about to be filled with ads", The Guardian, Jul. 12, 2017. 3 pages.
Golgowski, Nina, "This Burger King Ad Is trying to Control Your Google Home Device", Huffpost, Apr. 12, 2017. 7 pages.
Google Developers, "GoogleAssistant SDK" reprinted from https://developers.google.com/assistant/sdk/ Aug. 22, 2017. 4 pages.
Google Inc., Products Feed Specification, printed from Internet address: http://www.support.google.com/merchants/pin/answer.py?hl=en&answer=188494#US. Mar. 18, 2013. 6 pages.
Google Inc., Supported File Formats, printed from Internet address: http://www.support.google.com/merchants/bin/answer.py?hl=en&answer=160567, on Mar. 18, 2013. 1 page.
Gurman, et al., "Apple Is Manufacturing a Siri Speaker to Outdo Google and Amazon", Bloomberg, May 31, 2017. 5 pages.
Hardwick, Tim, "Facebook Smart Speaker Coming Next Year With 15-inch Touch Panel", MacRumors, Jul. 25, 2017. 5 pages.
Heater, "Amazon Alexa devices can finally tell voices apart", TechCrunch, Oct. 11, 2017. 6 pages.
Johnston, "Amazon Whirlwind: New Echo, Plus, Spot, Connect, Fire TV Take The Stage", Twice, Sep. 27, 2017. 1 pages.
Kelion, "Amazon revamps Echo smart speaker family", BBC News, Sep. 27, 2017. 11 pages.
Kelion, Leo, "Amazon's race to make Alexa smarter", BBC News, Jul. 28, 2017. 8 pages.
Koetsier, John, "Ads on Amazon Echo: Wndy's, ESPN, and Progressive Among Brands Testing", Forbes, May 11, 2017 2 pages.
Krishna, "Jim Beam's smart decanter will pour you a shot when you ask", engadget, Nov. 29, 2017. 3 pages.
Lacy, "Improving search and advertising are the next frontiers fro coice-activated devices", TechCrunch, Dec. 20, 2017. 13 pages.

(56) References Cited

OTHER PUBLICATIONS

Larson, Selena, "Google Home now recognizes your individual voice", CNN Money, San Francisco, California, Apr. 20, 2017. 3 pages.
Lee, "Take Two for Samsung's troubled Bixby assistant", BBC News, Oct. 19, 2017. 6 pages.
Lee, Dave, "The five gib announcements from Google I/O", BBC News, May 18, 2017. 9 pages.
Lund, Pamela, Mastering Google Product Feeds and Product Listing Ads $2013 Part 1, found at http://www.blueglass.com/blog/mastering-google-product-feeds=and-product=listing=ads=part-1/#comments, Dec. 28, 2013. 17 pages.
Nieva, Richard, "Google Home and eBay can tell you how much that's worth", cnet, Mar. 8, 2017. 3 pages.
Novet, et al., "Amazon is getting ready to bring Alexa to work", CNBC, Nov. 29, 2017. 4 pages.
Palladino, "Garmin teamed up with Amazon to make a tiny Echo Dot for your car", ars Technica, Oct. 17, 2017. 2 pages.
Patently Apple, "Apple Patent Reveals a New Security Feature Coming to Siri", Apr. 4, 2017, repirnted from http://www.patentlyapple.com/patently-apple/2017/04/apple-patent-reveals-a-new-security=feature-coming-to-siri.html, on Aug. 22, 2017. 6 pages.
Patently Mobile, "The Patent behind Google Home's new Feature of Understanding Different Voices in the Home Surfaced Today", Apr. 20, 2017, reprinted from http://www.patentlymobile.com/2017/04/the-patentbehind-google-homes-new-feature-of-understanding-different-voices-in-the-home-surfaced-today.html, Aug. 22, 2017. 3 pages.
Perez, "Alexa's 'Routines' will combine smart home control with other actions, like delivering your news and weather", TechCrunch, Sep. 28, 2017. 10 pages.
Perez, Sarah, "The first ad network for Alexa Skills shuts down following Amazon's policy changes", Tech Crunch. Jun. 15, 2017. 6 pages.
Porter, Jon, "Amazon Echo Show release date, price, news and features", Techradar, Jun. 26, 2017. 14 pages. 2017.
Pringle, "'I'm sorry to hear that': Why training Siri to be atherpist won't be easy", CBC News, Sep. 24, 2017. 3 pages.
Purcher, Jack, Today Google Home's Virtual Assistant can learn its Owner's voice for Security Reasons like Apple's Patent Pending Idea. Apr. 20, 2017. 4 pages.
Sablich, Justin, "Planning a Trip With the Help of Google Home", New York Times, May 31, 2017. 6 pages.
Seifert, Dan, "Samsung's new virtual assistant will make using your phone easier", The Verge, Mar. 20, 2017. 6 pages.
Sherr, Ian, "IBM built a voice assistant for cybersecurity", cnet, Feb. 13, 2017. 2 pages.
Siegal, Daniel, "IP Attys Load Up Apps' Legal Challenges At 'Silicon Beach'", Law360, Los Angeles, California, Feb. 2, 2017. 4 pages.
Unknown Author, "'Dolphin' attacks fool Amazon, Google Voice Assistants", BBC News, Sep. 7, 2017. 8 pages.
Willens, Max, "For publishers, Amazon Alexa holds promise but not much money (yet)", Digiday, Jul. 6, 2017. 6 pages.
European Patent Office; Search Report issued in U.S. Appl. No. 22/216,007, 12 pages, dated Mar. 17, 2023.
China National Intellectual Property Administration; Notification of First Office Action issued in Application No. 201780097541.2; 24 pages; dated Mar. 18, 2023.

\* cited by examiner

DISTRIBUTED IDENTIFICATION IN NETWORKED SYSTEM

BACKGROUND

Excessive network transmissions, packet-based or otherwise, of network traffic data between computing devices can prevent a computing device from properly processing the network traffic data, completing an operation related to the network traffic data, or responding timely to the network traffic data. Excessive transmission of network traffic data can also complicate data routing or degrade the quality of the response if the responding computing device is at or above its processing capacity, which may result in inefficient bandwidth utilization.

SUMMARY

According to at least one aspect of the disclosure, a system to customize content in a voice-activated system can include a data processing system. The data processing system can include an interface. The interface can receive a location of a first client computing device. The first client computing device can be associated with a first audio identification model. The interface can receive an audio input signal from a second client computing device. The second client computing device can be associated with a second audio identification model. The data processing system can include an authentication component. The authentication component can determine that the location of the first client computing device is within a predetermined distance to the second client computing device. The authentication component can provide, based on the determination that the location of the first client computing device is within the predetermined distance to the second client computing device, access to the first audio identification model, of the first client computing device, for processing of audio signals received by the second client computing device. The authentication component can generate a first identification score using a first audio identification model and a second identification score using the second audio identification model. The authentication component can select a profile from a plurality of candidate profiles based on the first identification score and the second identification score. The data processing system can include a content selection component to select a digital component based on the profile selected from the plurality of candidate profiles. The interface of the data processing system can transmit the digital component to the second client computing device in response to the audio input signal.

At least one aspect of the disclosure relates to a method to customize content in a voice-activated system. The method may include receiving the location of a first client computing device. The first client computing device may be associated with a first audio identification model. The method may include determining that the location of the first client computing device is within a predetermined distance to a second client computing device. The second client computing device may be associated with a second audio identification model. The method may include providing, based on the determination that the location of the first client computing device is within the predetermined distance to the second client computing device, access to the first audio identification model, of the first client computing device, for processing of audio signals received by the second client computing device. The method may include receiving an audio input signal from the second client computing device. The method may include generating a first identification score using the first audio identification model and a second identification score using the second audio identification model. The method may include selecting a profile from a plurality of candidate profiles based on the first identification score and the second identification score. The method may include selecting a digital component based on the profile. The method may include transmitting the digital component to the second client computing device.

According to at least one aspect of the disclosure, there is provided a digital assistant device configured to perform the method to customize content in a voice-activated system. For example, the digital assistant device can include an audio driver, a transducer, a sensor to detect an input audio signal, and a pre-processor component. The pre-processor component can be coupled to the audio driver, the transducer, and the sensor. The pre-processor component can filter the input audio signal to create a filtered input audio signal. The pre-processor component can convert the filtered input audio signal to data packets. The pre-processor component can transmit the data packets to a data processing system. The data processing system can include one or more processors and memory that execute a content selector component, an interface, and an authentication component. The data processing system can receive the location of a first client computing device. The first client computing device can be associated with a first audio identification model. The data processing system can determine that the location of the first client computing device is within a predetermined distance to the digital assistant device. The data processing system can, based on the determination that the location of the first client computing device is within the predetermined distance to the digital assistant device, provide the digital assistant device access to the first audio identification model of the first client computing device. The digital assistant device can be associated with a second audio identification model. The data processing system can generate a first identification score using the first audio identification model and a second identification score using the second audio identification model. The data processing system can select a profile from a plurality of candidate profiles based on the first identification score and the second identification score. The data processing system can select a digital component based on the profile selected from the plurality of candidate profiles. The data processing system can transmit the digital component to the second client computing device in response to the audio input signal.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
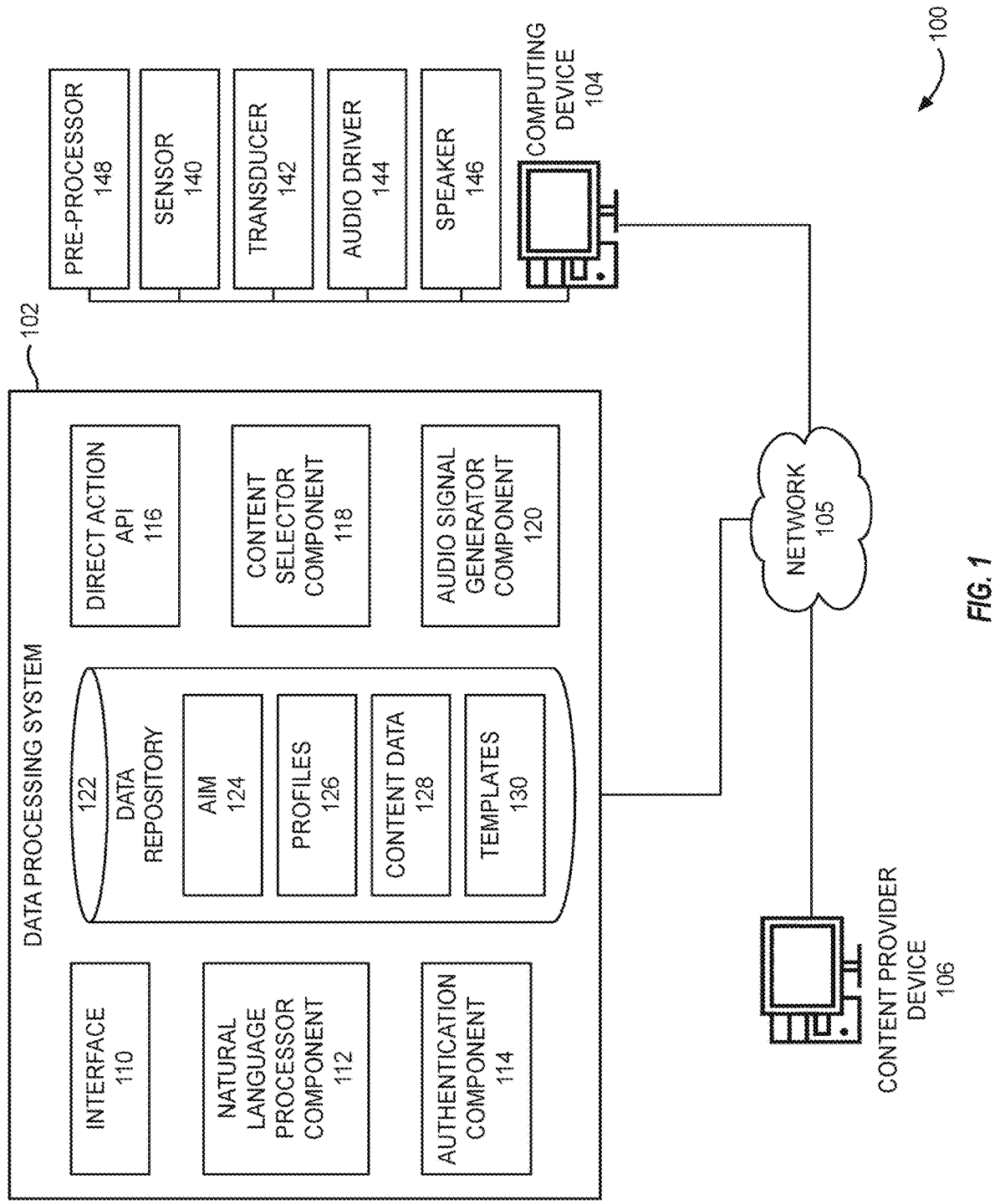
FIG. 1 illustrates an example system to customize content in a voice-activated data packet (or other protocol) based computer network environment.

Following below are more detailed descriptions of various concepts related to, and implementations of, methods, apparatuses, and systems for the authentication of packetized audio signals. The various concepts introduced above and discussed in greater detail below may be implemented in any of numerous ways.

The present disclosure is generally directed to a data processing system for identifying or verifying, with affirmative user consent, user identity in packetized audio signals in a voice activated computer network environment. The data processing system, via its authentication component, can improve the efficiency, effectiveness, and the resources required to identify or verify users with user consent. For example, the authentication component can enable audio identification models to be shared or cooperatively accessed among different client computing devices. The generation of audio identification models can be computationally intensive. Enabling the audio identification models to be used on a plurality of different client computing devices saves the computational resources of the system because audio identification models are only generated once rather than multiple times for each client computing device in the system. Additionally, the training of audio identification models can include the data transmission of sample audio files to the data processing system. Reducing the number of audio identification models that are generated reduces the amount of sample audio files sent to the data processing system and saves the network resources, such as bandwidth, of the system.

The data processing system can also generate audio identification models that enable more accurate identifications. Audio identification models generated from audio samples from a single physical location can be poor in making identifications when provided audio samples from a different physical location. For example, each of the different locations can include different ambient noise levels or other forms of interference that can make a single location audio identification model poor in making identifications in audio samples from a different physical location. When shared with different client computing devices, the data processing system can update audio identification models with audio samples from different physical locations, which can result in more robust audio identification models that can have a relatively higher accuracy in making identifications. Making accurate identifications can save system resources because digital components can be correctly customized or selected during a first process rather than requiring multiple corrections (e.g., in the form of multiple transmissions) between the data processing system and client computing device. Additionally, the use of the audio samples from the different locations is computationally free because the audio samples are already being supplied to the data processing system in the form of new requests. For example, the audio samples are not extra or additional requests made by the data processing system for training audio samples. Not having to request additional audio samples for training also reduces the use of network resources.

FIG. 1 illustrates an example system 100 to customize content in response to packetized audio signals in a voice activated data packet (or other protocol) based computer network environment. The system 100 can include at least one data processing system 102. The data processing system 102 can include at least one server having at least one processor. For example, the data processing system 102 can include a plurality of servers located in at least one data center or server farm. The data processing system 102 can determine from an input audio signal a request and a trigger keyword associated with the request. The data processing system's response to the request or the trigger can be user dependent. For example, the data processing system 102 can select different responses based on which user provided the input audio signal. The data processing system 102 can use voice recognition to determine which user provided the input audio signal. The data processing system 102 can respond to the request with one or more digital components that can include one or more audio files that when rendered provide an audio output or acoustic wave. The digital components can include other content formats (e.g., content in text, video, or image formats) in addition to audio-based content.

The data processing system 102 can include multiple, logically-grouped servers and facilitate distributed computing techniques. The logical group of servers may be referred to as a data center, server farm, or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 102 can include servers in a data center that are stored in one or more high-density rack systems, along with associated storage systems, located for example in an enterprise data center. The data processing system 102 with consolidated servers in this way can improve system manageability, data security, the physical security of the system, and system performance by locating servers and high-performance storage systems on localized high-performance networks. Centralization of all or some of the data processing system 102 components, including servers and storage systems, and coupling them with advanced system management tools allows more efficient use of server resources, which saves power and processing requirements and reduces bandwidth usage.

The data processing system 102 can include at least one natural language processor (NLP) component 112, at least one interface 110, at least one authentication component 114, at least one content selector component 118, at least one audio signal generator component 120, at least one direct action application programming interface (API) 116, and at least one data repository 122. The NLP component 112, the interface 110, the authentication component 114, the content selector component 118, the audio signal generator component 120, and the direct action API 116 can each include at least one processing unit, server, virtual server, circuit, engine, agent, appliance, or other logic device, such as programmable logic arrays, configured to communicate with the data repository 122 and with other computing devices (e.g., the client computing device 104 or the content provider computing device 106) via the at least one computer network 105. The network 105 can include computer networks such as the internet, local, wide, metro, or other area networks, intranets, satellite networks, other computer networks such as voice or data mobile phone communication networks, and combinations thereof.

The network 105 can include a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the content provider computing device 106.

The network 105 can include, for example a point-to-point network, a broadcast network, a wide area network, a local area network, a telecommunications network, a data communication network, a computer network, an Asynchronous Transfer Mode (ATM) network, a Synchronous Optical Network (SONET) network, a Synchronous Digital Hierarchy (SDH) network, a wireless network or a wireline network, and combinations thereof. The network 105 can include a wireless link, such as an infrared channel or satellite band. The topology of the network 105 may include a bus, star, or ring network topology. The network 105 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), or universal mobile telecommunications system ("UMTS"). Different types of data may be transmitted via different protocols, or the same types of data may be transmitted via different protocols.

The client computing device 104 and the content provider computing device 106 can each include at least one logic device such as a computing device having a processor to communicate with each other or with the data processing system 102 via the network 105. The client computing device 104 and the content provider computing device 106 can each include at least one server, processor, or memory, or a plurality of computation resources or servers located in at least one data center. The client computing device 104 and the content provider computing device 106 can each include at least one computing device such as a desktop computer, laptop, tablet, personal digital assistant, smartphone, portable computer, thin client computer, virtual server, speaker-based assistant device, or other computing device.

The client computing device 104 can include at least one sensor 140, at least one transducer 142, at least one audio driver 144, at least one speaker 146, and at least one pre-processor 148. The sensor 140 can include a microphone or audio input sensor. The sensor 140 can also include at least one of a GPS sensor, proximity sensor, ambient light sensor, temperature sensor, motion sensor, accelerometer, or gyroscope. The transducer 142 can convert the audio input into an electronic signal. The audio driver 144 can include a script or program executed by one or more processors of the client computing device 104 to control the sensor 140, the transducer 142, or the audio driver 144, among other components of the client computing device 104, to process audio input or provide audio output. The speaker 146 can transmit (or render) the audio output signal.

The pre-processor component 148 can be coupled with the audio driver 144, the transducer 142, and the sensor 140. The pre-processor component 148 can be or include one or more processors that perform functions on received signals before the signals are transmitted to data processing system 102 or processed by other components of the client computing device 104. For example, the pre-processor component 148 can filter the input audio signals detected by the transducer 142 (or input audio signals that are otherwise received by the client computing device 104) to create a filtered input audio signal. The filtering by the pre-processor 148 can include filtering (or reducing) noise in the input audio signal, the amplification of predetermined frequencies in the input audio signal, the reduction of predetermined frequencies in the input audio signal, or up-sampling or down-sampling of the input audio signal. The pre-processor component 148 can convert the filtered input audio signal to data packets and transmit the data packets to the data processing system 102 via the network 105.

The client computing device 104 can be associated with an end user that enters voice queries as audio input into the client computing device 104 (via the sensor 140 or transducer 142) and receives audio output in the form of a computer generated voice that can be provided from the data processing system 102 (or the content provider computing device 106). The client computing device 104 can output the audio output from the speaker 146. The computer generated voice can include recordings from a real person or computer generated language.

The content provider computing device 106 can provide audio-based digital components for display by the client computing device 104 as an audio output digital component. The digital component can include an offer for a good or service, such as a voice based message that states: "Would you like me to order you a taxi?" For example, the content provider computing device 106 can include memory to store a series of digital audio components that can be provided in response to a voice based query. The content provider computing device 106 can also provide audio-based digital components (or other digital components) to the data processing system 102 where they can be stored in the data repository 122 for transmission to the client computing device 104. The data processing system 102 can select the digital audio components and provide (or instruct the content provider computing device 106 to provide) the digital audio components to the client computing device 104. The digital components can include security questions that are generated to authenticate the user of the client computing device 104. The audio-based digital components can be exclusively audio or can be combined with text, image, or video data.

The data repository 122 can include one or more local or distributed databases and can include a database management system. The data repository 122 can include computer data storage or memory and can store one or more audio identification models 124 (abbreviated to AIM in FIG. 1), profiles 126, content data 128, or templates 130 among other data. The content data 128 can include digital components or associated metadata as well as input audio messages that can be part of one or more communication sessions with the client computing device 104. The templates 130 can include data structures that can be used in communications with the client computing device 104. The templates 130 can include one or more place holders that the data processing system 102 can fill with, for example, content data 128, digital components, or other data.

The authentication component 114, can use the audio identification models 124 to perform voice recognition (e.g., identify a first user from a second user based on an input audio signal, with user consent). An audio identification model 124 can include a data structure that characterizes, with user consent, a given user's voice characteristics. For example, the audio identification model 124 can be a voiceprint that includes a spectrogram of the user's speech. The audio identification model 124 can indicate frequencies and patterns the user may use when speaking. The authentication component 114 can use the audio identification models 124 for user verification (e.g., to determine that a user is who the user claims to be in a 1-to-1 match of the input signal with the audio identification model 124 associated with the user) or user identification (e.g., to identify, with user consent, the user in a 1-to-N match by passing the input audio signal to N audio identification models 124 to determine which one is most likely to be the user's).

The data processing system 102 can generate an audio identification model 124, for a given user, by requesting the user provide one or more sample input audio signals. The sample input audio signals can be text-independent (e.g., the user provides random samples) or text-dependent (e.g., the user generates the input audio signal by reading a predefined script). The user, with consent, can provide the sample input audio signals to the data processing system 102 via a client computing device 104. Once generated, the data processing system 102 can store the audio identification model 124 in the data repository 122 in association with an indication of the client computing device 104 that sent the sample input signals. In some implementations, until a user provides explicit approval, the authentication component 114 can only process input audio signals from a given client computing device 104 with audio identification models 124 generated using sample input audio signals received at the given client computing device 104. For example, without explicit approval, the authentication component 114 does not use the audio identification models 124 of a first user to process input audio samples from a different user and different client computing device 104.

The data processing system 102 can associate each of the audio identification models 124 with a profile 126. For example, an audio identification model 124 can correspond to a profile 126 or client computing device 104. A profile 126 can include a policy, data, device information, or data structures that the data processing system 102 can use when selecting digital components to provide in response to an input query. For example, the profile can include preferences or rules for the selection of digital components. The profiles 126 and the audio identification models 124 can be stored at the data processing system 102, the client computing device 104, or both.

The data processing system 102 can include an application, script or program installed at the client computing device 104, such as an app to communicate input audio signals to the interface 110 of the data processing system 102 and to drive components of the client computing device 104 to render output audio signals. The data processing system 102 can receive data packets or other signals that include or identify an input audio signal. For example, the data processing system 102 can execute or run the NLP component 112 to receive the input audio signal. The transducer 142 or sensor 140 can detect the input audio signal. The NLP component 112 can convert or parse the input audio signal into recognized text by comparing the input signal against a stored representative set of audio waveforms and choosing the closest matches. The representative waveforms can be generated across a large set of input signals. The user can provide some of the input signals. Once the audio signal is converted into recognized text, the NLP component 112 can match the text to words that are associated, for example via a learning phase, with actions that the system 100 can make. Via the transducer 142, the audio driver 144, or other components, the client computing device 104 can provide the input audio signal to the data processing system 102 (e.g., via the network 105) where it can be received (e.g., by the interface 110) and provided to the NLP component 112 or stored in the data repository 122 as content data 128.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport; however, the trigger keyword indicates that transport is an ancillary action to at least one other action that is indicated by the request.

The content selector component 118 can obtain digital components from the data repository 122, where it can be stored as part of the content data 128. The content selector component 118 can query the data repository 122 to select or otherwise identify the digital component, e.g., from the content data 128. The content selection component 118 can use a selected profile 126 to select or generate custom digital components in response to an input query. The content selector component 118 can also select the digital component from the content provider computing device 106. For example, responsive to a query received from the data processing system 102, the content provider computing device 106 can provide a digital component to the data processing system 102 (or component thereof) for eventual output by the client computing device 104.

The audio signal generator component 120 can generate or otherwise obtain an output signal that includes the digital component. For example, the data processing system 102 can execute the audio signal generator component to generate or create an output signal corresponding to the digital component. The interface 110 of the data processing system 102 can provide or transmit one or more data packets that include the output signal via the computer network 105 to the client computing device 104. For example, the data processing system 102 can provide the output signal from the data repository 122 or from the audio signal generator component 120 to the client computing device 104. The interface 110 can be a hardware interface, such as a network port data port, or wireless radio, that enables the data processing system 102 to receive and transmit data. The interface 110 can be graphical-based. For example, the interface 110 can be a graphical user interface that enables a user to input data or otherwise interact with the data processing system 102. The data processing system 102 can also instruct, via data packet transmissions, the content provider computing device 106 to provide the output signal to the client computing device 104. The output signal can be obtained, generated, transformed to, or transmitted as one or more data packets (or other communications protocol) from the data processing system 102 (or other computing device) to the client computing device 104.

The content selector component 118 can select the digital component for the action of the input audio signal as part of a real-time content selection process. For example, the digital component can be provided to the client computing device for transmission as audio output in a conversational manner in direct response to the input audio signal. The real-time content selection process to identify the digital component and provide the digital component to the client computing device 104 can occur within one minute from the time of the input audio signal and be considered real-time.

The output signal that corresponds to the digital component, for example, an output signal that was obtained or generated by the audio signal generator component 120 transmitted via the interface 110 and the computer network 105 to the client computing device 104, can cause the client computing device 104 to execute the audio driver 144 to drive the speaker 146 to generate an acoustic wave corresponding to the output signal. The acoustic wave can include words corresponding to the digital component.

The direct action API 116 of the data processing system can generate, based on the trigger keyword, action data structures. The direct action API 116 can execute a specified action to satisfy the end user's intention, as determined by the data processing system 102. Depending on the action specified in its inputs, the direct action API 116 can execute code or a dialog script that identifies the parameters required to fulfill a user request. The action data structures can be generated responsive to the request.

The direct action API 116 can obtain content data 128 (or parameters, policies, or digital components) from the data repository 122, as well as data received with end user consent from the client computing device 104 to determine location, time, user accounts, logistical or other information in order to reserve a car from a car share service. The content data 128 can be included in the action data structure. When the content included in the action data structure includes end user data that is used for authentication, the data can be passed through a hashing function before being stored in the data repository 122.

The data processing system 102 can also include the authentication component 114. The authentication component 114 can recognize or identify users based on the input audio signals. Identifying or recognizing a user, the authentication component 114 can select a profile 126 that the content selector component 118 can use in the selection of a digital component.

The authentication component 114 can enable different client computing devices 104 to share audio identification models 124. For example, one or more audio identification models 124 can be generated for, and associated with, each of the client computing devices 104. The authentication component 114 can associate each of the audio identification models 124 with a different user of a client computing device 104. Without the sharing of the audio identification models 124, a given client computing device 104 may only have access to its audio identification models 124. For example, the client computing device 104 can access the audio identification models 124 that were generated using audio data from the respective client computing device 104 but cannot access the audio identification models 124 that were generated using audio data from a different client computing device 104.

Sharing the audio identification model 124 can include providing the authentication component 114 access to use the audio identification models 124 of a first client computing device 104 with input audio signals received from a second client computing device 104. Sharing can include providing client computing devices 104 associated with the first user access to the audio identification models 124 associated with a second user. For example, a first user may be a registered user of a first and second client computing device 104. The first and the second client computing devices 104 can access audio identification models 124 that are either jointly or separately created for the respective client computing devices 104. A joint audio identification model 124 may include audio input data from both the first and second client computing devices 104 (e.g., more than one client computing device 104) and separate audio identification models 124 may include only audio input data from a single client computing device 104. The second user may be a registered user of a third and fourth client computing device 104. In this example, if the authentication component 114 shares the first user's audio identification models 124 with the second user, the authentication component 114 can use audio identification models 124 associated with the first and second client computing devices 104 to process input audio signals received by the third and fourth client computing devices 104.

Sharing the audio identification models 124 can include the process of the authentication component 114 providing a client computing device 104 access to audio identification models 124 of a different client computing devices 104 (where the different client computing devices 104 may or may not be associated with different users). For example, a first client computing device 104 can have access to a first audio identification model 124 and a second client computing device 104 can have access to a second audio identification model 124. Sharing the first audio identification model 124 with the second client computing device 104 can enable the second client computing device 104 to access the first audio identification model 124. Providing access to an audio identification model 124 can include providing a client computing device 104 with direct access to an audio identification model 124 (e.g., the audio identification model 124 is downloaded or transmitted to the client computing device 104) or providing indirect access to the audio identification model 124. For example, when providing indirect access, the shared audio identification model 124 can remain in the data repository 122 (e.g., a copy of the audio identification model 124 is not transmitted to the client computing device 104 with which the audio identification model 124 is shared). In this example, where indirect access is provided, the authentication component 114 is authorized to use the shared audio identification models 124 in the analysis of input audio signals received from client computing devices 104 with which the audio identification models 124 are shared.

The authentication component 114 can provide a first client computing device 104 access to the audio identification model 124 of a second client computing device 104 only after receiving explicit approval from a user associated with the second client computing device 104. For example, by default a client computing device 104 cannot access the audio identification models 124 associated with another user or client computing device 104.

A user can initiate the sharing of audio identification models 124. A user, via a client computing device 104, can add identifiers of client computing devices 104 that the data processing system 102 is allowed to provide access to the audio identification models 124 associated with the user. For example, via a graphical user interface executed by the user's client computing device 104 (e.g., a mobile device), the user may enter an ID of a friend's speaker-based assistant device. The authentication component 114 can then provide the friend's speaker-based assistant device access to one or more of the audio identification models 124 associated with the user.

The authentication component 114 can initiate the sharing of audio identification models 124. The authentication component 114 can initiate the sharing based on associations between one or more user's or client computing devices 104. For example, after adding a user to a "family group" or other social group, the authentication component 114 can prompt the user for permission to share one or more audio identification models 124 with the user added to the group. In another example, the authentication component 114 can prompt the user for permission to share one or more audio identification models 124 when one of the user's client computing devices 104 is within a predetermined proximity, range, or distance of another client computing device 104.

For example, the client computing device 104 can periodically transmit location information to the data processing system 102 (after receiving permission from the user). The location information can include physical location information as determined by the client computing device 104 (e.g., through the use of cellular triangulation or an on-board GPS receiver). The location information can include approximations for the location of the client computing device 104. For example, Wi-Fi network names or IP addresses can sever to provide approximate or relative location information.

The authentication component 114 can receive the location information of the client computing device 104, for example, via the interface 110. The authentication component 114 can associate the client computing device 104 that transmitted the location information with an audio identification model 124. The associated audio identification model 124 can be an audio identification model 124 created on or for the client computing device 104 or for a second client computing device 104. For example, the client computing device 104 that transmitted the location information can be a mobile device. The associated audio identification model 124 can be an audio identification model 124 that was generated for the mobile device or an audio identification model 124 that was generated for the user's speaker-based assistant device that is current at a location different than the client computing device 104 that transmitted the location information (e.g., the user's home).

The authentication component 114 can determine that the location of the client computing device 104 (that transmitted the location information) is within a predetermined distance to a second client computing device 104. The predetermined distance can be about the size of an average room, house, or building such that the authentication component 114 determines that the two client computing devices 104 are within the predetermined distance when the two client computing devices 104 are within the same room, house, or building, respectively. Determining the two client computing devices 104 are within the predetermined distance can also be based on relative locations of the two client computing devices 104. For example, the authentication component 114 can determine the two client computing devices 104 are within relatively close proximity to one another when the two client computing devices 104 are on the same network (e.g., Wi-Fi network) or have established a connection with one another via, for example, an ad hoc Wi-Fi network or Bluetooth connection.

Initially, the authentication component 114 can associate the second client computing device 104 with audio identification models 124 that are different than the audio identification models 124 the authentication component 114 associates with the first client computing device 104.

Before sharing an audio identification model 124 of a first client computing device 104 with a second client computing device 104, the authentication component 114 can transmit an authorization notification, via the interface 110, to the first client computing device 104. The authorization notification can request permission for the authentication component 114 to share one or more audio identification models 124 associated with the first client computing device 104 with the second client computing device 104. The authentication component 114 can transmit, via the interface 110, the authorization notification to the first client computing device 104 based on the authentication component 114 determining that the first and the second client computing devices 104 are within the predetermined distance of one another. The authorization notification can be a push notification, text message, email message, application notification, or other type of electronic communication. When the user selects, confirms, or otherwise responds to the authentication notification (via the first client computing device 104 or other device), the first client computing device 104 can transmit an approval message to the authentication component 114. Responsive to receiving the approval message, the authentication component 114 can associate one or more audio identification models 124 of the first client computing device 104 with the second client computing device 104.

Associating the first client computing device's client audio identification model 124 with the second client computing device 104 can include providing the second client computing device 104 with access, based on determining that the location of the first client device is within the predetermined distance to the second client computing device, to one or more audio identification models 124 of the first client computing device 104. For example, the data processing system 102 can maintain a data structure that indicates which audio identification models 124 each client computing device 104 is allowed to access. Providing access to an audio identification model 124 can include adding a reference to the table to indicate that the client computing device 104 now has access to the audio identification model 124 (or that the audio identification model 124 can be used to analyze input audio signals form the client computing device 104). In some implementations, providing access to an audio identification model 124 can include transmitted or otherwise storing the audio identification model 124 on the client computing device 104 or computer readable memory accessible by the client computing device 104.

Once the authentication component 114 provides the second client computing device 104 access to the audio identification models 124 of the first client computing device 104, the second client computing device 104 can use the first client computing device's audio identification models 124 in identifying the speaker of input audio signals received by the second client computing device 104. The client computing device 104 can execute an instance of the authentication component 114 to make the determination locally or the data processing system's instance of the authentication component 114 can make the determination.

In one example, the second client computing device 104 can be a speaker-based assistant device that can detect audio-based input queries. The speaker-based assistant device can convert an audio-based input query into an electronic signal that the pre-processor 148 can process and transmit to the data processing system 102 as an input audio signal. The data processing system 102 can provide digital components to the client computing device 104 based on the input audio signal. The data processing system 102 can select the digital components based on an identification of the user the spoke the query. The authentication component 114 can use the audio identification models 124 (including the shared audio identification models 124) to determine which user spoke the query.

To determine which user spoke the query, the authentication component 114 can process the input audio signal with each of the audio identification models 124 to generate different identification scores. The authentication component 114 can use the input audio signal or a portion thereof as input into each of the audio identification models 124. For example, a speaker-based assistant device can include a first audio identification model 124 for the owner of the speaker-based assistant device and a second audio identification model 124 for the owner's friend, which the friend is currently sharing with the speaker-based assistant device. Responsive to receiving an input audio signal, the authentication component 114 can input the input audio signal into the friend's audio identification model 124 and the owner's audio identification model 124. Each of the audio identification models 124 can generate an identification score between 0 and 1 that can indicate the likelihood that the owner of the respective audio identification model 124 generated the input audio signal. The authentication component 114 can include hidden Markov models, Gaussian mixture models, pattern matching algorithms, or neural networks that receive the input audio signal and generate the identification score.

The data processing system 102 can store each of the users or audio identification models 124 in association with a different profile 126. The authentication component 114 can select the profile 126 from different candidate profiles. The candidate profiles can be each of the profiles 126 the client computing device 104 that transmitted the audio input file to the data processing system 102 has access to. In the above example, the candidate profiles are the profiles 126 of the speaker-based assistant device's owner and the friend.

The authentication component 114 can select the profile 126 from the candidate profiles based on the identification scores the authentication component 114 generates by processing the input audio signal with each of the audio identification models 124. The authentication component 114 can rank the identification scores to select the profile 126 that is most likely to be that of the user that spoke the query.

Each of the audio identification models 124 can include metadata. The metadata can include an error rate of the audio identification model 124, an indication of a sensor type used in the generation of the audio identification model 124, an indication of the amount of data used to generate the audio identification model 124, or a number of sensors used in the generation of the audio identification model 124. The authentication component 114 can base the selection of the profile or ranking of the identification scores on the metadata for each of the audio identification models 124.

For example, given an input audio signal, a first audio identification model 124 can generate an identification score of 0.9 and a second audio identification model 124 can generate an identification score of 0.87. The first audio identification model 124 can have an accuracy of 65% and the second audio identification model 124 can have an accuracy of 99%. In this example, the authentication component 114 can select the profile associated with the second audio identification model 124 even though the second audio identification model 124 generated a lower identification score because the second audio identification model 124 has a higher accuracy than the first audio identification model 124.

The authentication component 114 can revoke access to shared audio identification models 124. The authentication component 114 can revoke access to audio identification models 124 when instructed by a user. For example, a user can send a revocation message to the data processing system 102 instructing the authentication component 114 to revoke the access of one or more client computing devices 104 to the user's audio identification models 124.

The authentication component 114 can automatically revoke access to shared audio identification models 124. The revocation can be time-based or location-based. For example, the authentication component 114 can automatically revoke access to a shared audio identification model 124 between about 1 hour and about 6 hours, between about 1 hour and about 12 hours, between about 1 hour and about 18 hours, or between about 1 hour and about 24 hours after access is granted to the shared audio identification model 124.

The revocation of shared audio identification model 124 can be location based. For example, the authentication component 114 can determine that a first client computing device 104 sharing one of its audio identification models 124 with a second client computing device 104 exited the predetermined distance around the second client computing device 104. Determining the first client computing device 104 is no longer within the required distance to the second client computing device 104, the authentication component 114 can revoke the second client computing device's access to the shared audio identification model 124. The revocation can be automatic. For example, the user does not need to approve the revocation.

The authentication component 114 can merge or update audio identification models 124. For example, when an audio identification model 124 is shared with a client computing device 104, the client computing device 104 can use the shared audio identification model 124 to process input audio signals. When the authentication component 114 determines that the input audio signal includes a query by the owner of the shared audio identification model 124, the authentication component 114 can update the audio identification model 124 based on the new input audio signal.

In some implementations, when the authentication component 114 determines that the input audio signal includes a query by the owner of the shared audio identification model 124, the authentication component 114 can generate a temporary audio identification model 124. The authentication component 114 can use the temporary audio identification model 124 in the analysis of incoming input audio signals while the client computing device 104 has access to the shared audio identification model 124.

When the authentication component 114 revokes the client computing device's access to the shared audio identification model 124, the authentication component 114 can discard, erase, or purge the temporary audio identification model 124 from the data repository 122. When the authentication component 114 revokes the client computing device's access to the shared audio identification model 124, the authentication component 114 can merge the temporary audio identification model 124 into the shared audio identification model 124 (e.g., the authentication component 114 can update the shared audio identification model 124 with data from the temporary audio identification model 124).

Figure 2:
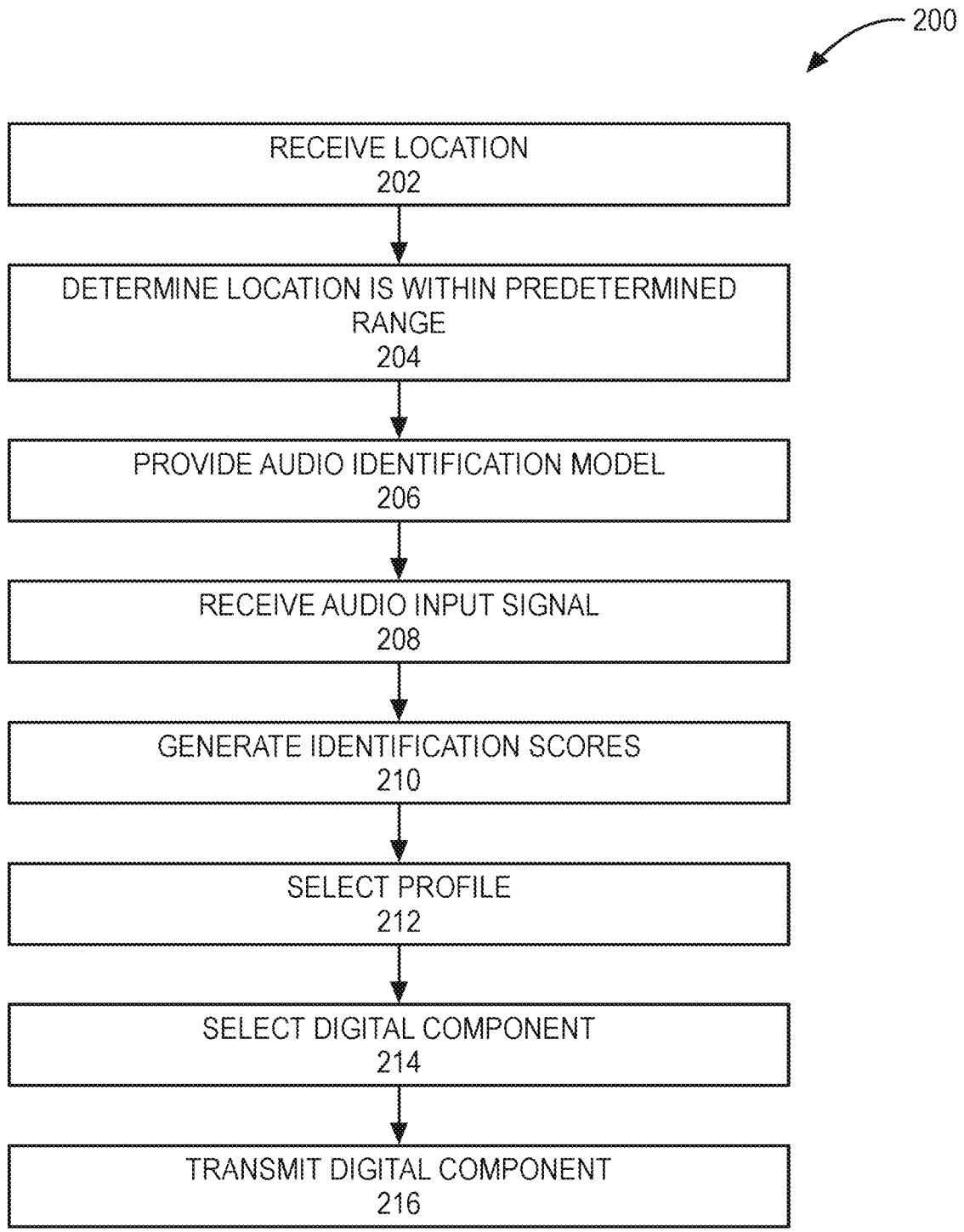
FIG. 2 illustrates a flow diagram of an example method to customize content in the system illustrated in FIG. 1.

FIG. 2 illustrates a flow diagram of an example method 200 to customize content in a voice-activated system. The method 200 can include receiving location information (ACT 202). The method 200 can include determining the location is within a predetermined range (ACT 204). The method 200 can include providing an audio identification model (ACT 206). The method 200 can include receiving an input audio signal (ACT 208). The method 200 can include generating identification scores (ACT 210). The method 200 can include selecting a profile (ACT 212). The method 200 can include selecting a digital component (ACT 214). The method 200 can include transmitting the digital component (ACT 216).

Figure 3:
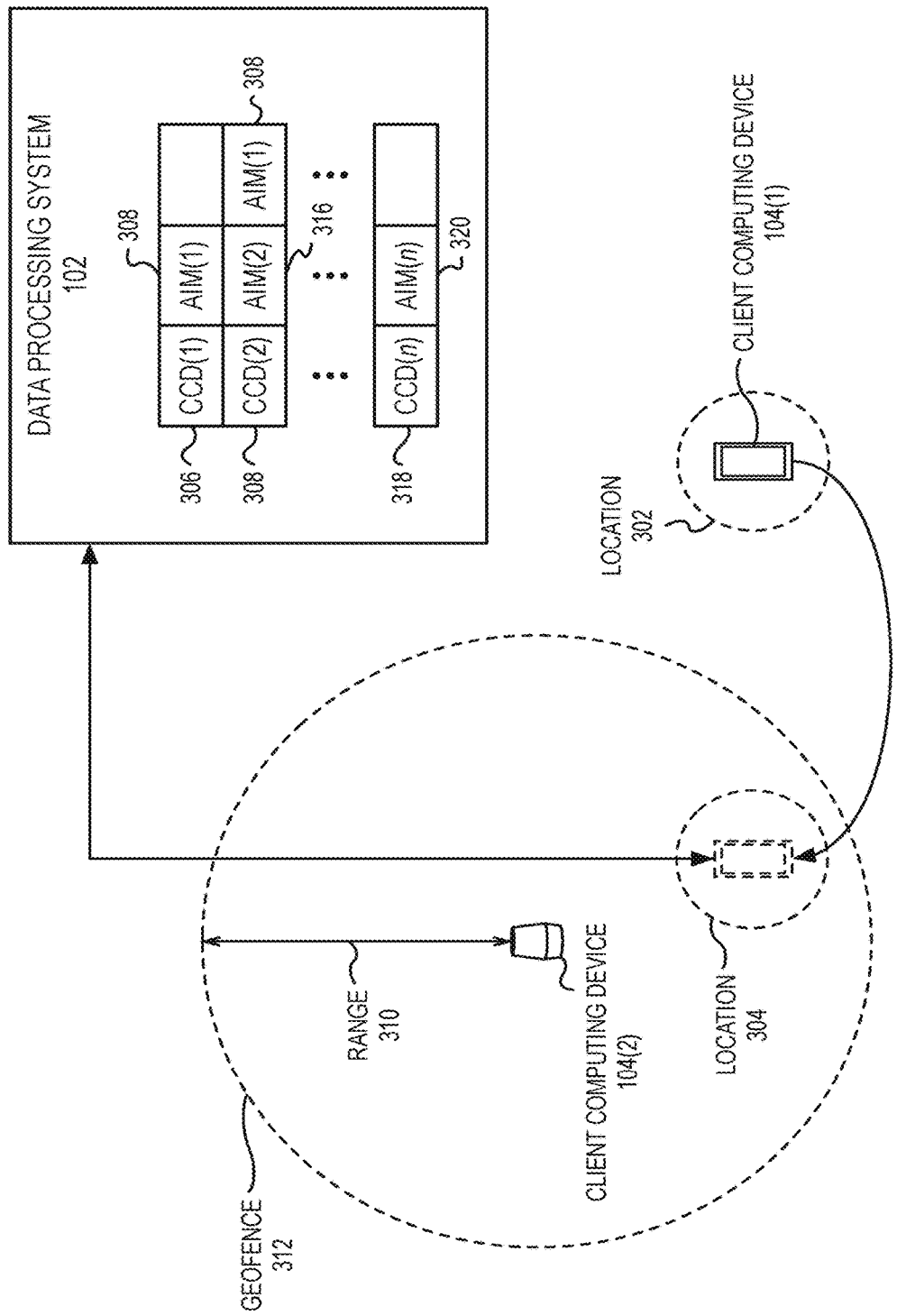
FIG. 3 illustrates a block diagram of a first client computing device sharing an audio identification model with a second client computing device.

Referring to FIGS. 2 and 3, among others, the method 200 can include receiving a location (ACT 202). FIG. 3 illustrates a block diagram of a first client computing device 104(1) sharing an audio identification model with a second client computing device 104(2) (the first client computing device 104(1) and the second client computing device 104(2) can be collectively referred to as client computing devices 104). As set forth above, the method 200 can include the data processing system 102 receiving a location of a first client computing device 104(1).

For example, the client computing device 104(1) can have an initial location 302 distant from the second client computing device 104(2). The client computing device 104(1) can move to the location 304 that can be a different location than the initial location 302. The client computing device 104(1) can periodically transmit its location to the data processing system 102. The client computing device 104(1) can transmit its location to the data processing system 102 when the client computing device 104(1) determines that its location or approximation for location (e.g., Wi-Fi network name) change.

The client computing device 104(1) can be associated with a first audio identification model. For example, the first client computing device 104(1) can have a corresponding first audio identification model. The association of the client computing device 104(1) with an audio identification model can include the storing of an identifier of the client computing device 104(1) in association with the audio identification model (or an indication thereof). For example, as illustrated in FIG. 3, an indication of the client computing device 104(1), illustrated as CCD(1) 306, is stored in a data structure (within the data repository 122) with an indication of a first audio identification model, illustrated as AIM(1) 308. The storing of the CCD(1) 306 with the AIM(1) 308 can indicate to the data processing system 102 (or the components thereof) that the client computing device 104(1) can access the audio identification model 124 identified by the AIM(1) 308.

The method 200 can include determine the received location is within a predetermined range (ACT 204). The predetermined range can be a predetermined distance around the client computing device 104(2). For example, the authentication component 114 can determine that the client computing device 104(1) is within the same apartment as the client computing device 104(2).

As illustrated in FIG. 3, the predetermined range 310 (which can also be referred to as a predetermined distance 310) defines a geofence 312 around the client computing device 104(2). The range 310 can be a set length of distance, such as a given number of feet or meters. The range 310 can also be approximated. For example, the geofence 312 may be defined by a Wi-Fi network such that the client computing device 104(1) is within the range 310 of the client computing device 104(2) when the client computing device 104(1) and the client computing device 104(2) are on the same Wi-Fi network.

The method 200 can include providing access to the audio identification model 124 of the client computing device 104 (ACT 206). For example, the authentication component 114 can provide the client computing device 104(2) access to one or more audio identification models 124 of the client computing device 104(1), such as the audio identification model 124 that corresponds to the client computing device 104(1). Providing the client computing device 104(1) with access to the audio identification model 124 can include transmitting a copy of the audio identification model 124 to the client computing device 104(1), which the client computing device 104(1) can use to process input audio signals. Providing access to an audio identification model 124 can include associating, based on determining that the location of the first client devise 104(1) is within the predetermined range 310 of the second client computing device 104(2), the audio identification model 124 of the first client computing device 104(1) with the client computing device 104(2) within the data processing system 102. In this example, the audio identification model 124 may not be transmitted to the first client computing device 104(1), but an indication of the first client computing device 104(1) may be stored in association with the audio identification model 124 to indicate that the client computing device 104(1) is authorized to access or otherwise use the audio identification model 124.

For example, when the client computing device 104(1) moves from the location 302 to the location 304, and within the geofence 312, the authentication component 114 can transmit an authorization notification to the client computing device 104(1). The authorization notification can request permission, from the user of the client computing device 104(1), to provide the client computing device 104(2) access to the audio identification model 124 of the client computing device 104(1). The authentication component 114, receiving permission, can provide the client computing device 104(2) access to the audio identification model 124 of the client computing device 104(1).

As illustrated in FIG. 3, the authentication component 114 can add the AIM(1) 308 to the list of audio identification models 124 that the client computing device 104(2) is authorized to access. For example, the indication of the client computing device 104(2), illustrated as CCD(2) 314, is stored in association (or otherwise corresponds) with an indication of the client computing device's 104(2) own audio identification model 124, illustrated as AIM(2) 316, and the AIM(1) 308. The authentication component 114 can repeat this process for any number of client computing devices 104, as illustrated by the indication of client computing device 104(n), illustrated as CCN(n) 318, stored in association with an indication of audio identification model 124(n), illustrated as AIM(n) 320.

The method 200 can include receiving an input audio signal (ACT 208). The data processing system 102 can receive the input audio signal from the client computing device 104(2). A user can ask a voice-based query to the client computing device 104(2). The client computing device 104(2) can detect the query and convert the query into an electronic signal via the transducer 142 (e.g., a microphone). The pre-processor 148 can filter and packetize the input audio signal, and the client computing device 104(2) can transmit the input audio signal to the data processing system 102 for further processing.

The NLP component 112 can parse the input audio signal to identify a request in the input audio signal. The data processing system's response to the request can be based on an identification of which user provided the input audio signal. For example, the query "Ok, what is next on my calendar?" is user-dependent in that the data processing system 102 can provide different results to different users because each of the users can have different events on their respective calendars. The authentication component 114 can determine which user spoke the query to the client computing device 104(2) using the audio identification models 124 to which the client computing device 104(2) has access.

The method 200 can include generating identification scores (ACT 210). The authentication component 114 can provide the input audio signal to each of the audio identification models 124 to which the client computing device 104(2) has access. For example, and referring to FIG. 3, when the client computing device 104(2) receives an input audio signal and transmits the input audio signal to the data processing system 102, the authentication component 114 can pass the input audio signal to the audio identification model 124 indicated by AIM(2) 316 and AIM(1) 308. For this example, the authentication component 114 generates a first identification score and a second identification score.

The method 200 can include selecting a profile (ACT 212). For example, the method 200 can include selecting the profile from a plurality of candidate profiles. Each audio identification model 124 can be associated with a profile. In the example illustrated in FIG. 3, the audio identification model 124 indicated by AIM(2) 316 can be associated with the profile of the owner (or registered user) of the client computing device 104(2). The audio identification model 124 indicated by AIM(1) 308 can be associated with the profile of the owner (or registered user) of the client computing device 104(1). These two profiles can be collectively referred to as the candidate profiles.

The authentication component 114 can make the selection based on the identification scores generated during ACT 210. The authentication component 114 can rank the identification scores and select the identification score with the highest score. The authentication component 114 can modify the ranking or the identification scores based on each of the audio identification models' metadata. For example, the authentication component 114 can lower the identification score generated by an audio identification model 124 with a low accuracy when compared to an audio identification model 124 with a high accuracy.

The method 200 can include selecting a digital component (ACT 214). The authentication component 114 can provide the selected profile (from ACT 212) to the content selection component 118. The content selection component 118 can select the digital component using or based on the profile selected during ACT 212. For example, the profile can include preferences or rules for selecting a digital component to provide to the user associated with the profile.

The method 200 can include transmitting the digital component (ACT 216). The data processing system 102, via the interface 110, can transmit the digital component to the client computing device 104(2) (e.g., the client computing device 104 that supplied the input audio signal).

The method 200 can also include revoking access to the shared audio identification model 124. For example, when the client computing device 104(1) leaves the area defined by the geofence 312 (or the general proximity of the client computing device 104(2)), the client computing device 104(1) can transmit the updated location information to the data processing system 102. Determining that the client computing device 104(1) is no longer within the predetermined range 310 of the client computing device 104(2), the authentication component 114 can delete or remove the AIM(1) 308 from the list of audio identification models 124 associated with the client computing device 104(2). The revocation process can occur after a predetermined amount of time. For example, if the time out period is 1 day and after 1 day the client computing device 104(1) is still within the predetermined range, the authentication component 114 can automatically revoke access to the shared audio identification model 124. The automatic revocation of access to shared audio identification models improves security of user's data and the shared audio identification models.

According to at least one aspect of the disclosure, there is provided a system configured to perform the method to customize content in a voice-activated system above. For example, the system can include a data processing system. The data processing system can include an interface. The interface can receive a location of a first client computing device. The first client computing device can be associated with a first audio identification model. The interface can receive an audio input signal from a second client computing device. The second client computing device can be associated with a second audio identification model. The data processing system can include an authentication component. The authentication component can determine that the location of the first client computing device is within a predetermined distance to the second client computing device. The authentication component can provide, based on the determination that the location of the first client computing device is within the predetermined distance to the second client computing device, the second client computing device access to the first audio identification model of the first client computing device. The authentication component can generate a first identification score using a first audio identification model and a second identification score using the second audio identification model. The authentication component can select a profile from a plurality of candidate profiles based on the first identification score and the second identification score. The data processing system can include a content selection component to select a digital component based on the profile selected from the plurality of candidate profiles. The interface of the data processing system can transmit the digital component to the second client computing device in response to the audio input signal.

The interface may receive a second location of the first client computing device. The authentication component may determine that the second location of the first client computing device is outside the predetermined distance to the second client computing device, and, based on determining that the second location of the first client computing device is outside the predetermined distance, may revoke access of the second client computing device to the first audio identification model of the first client computing device. The authentication component may rank the first identification score and the second identification score based on metadata of the first audio identification model and metadata of the second audio identification model. The metadata of the first audio identification model and the metadata of the second audio identification model may comprise at least one of an error rate, an indication of a sensor type, and a number of sensors. The profile may be associated with a user of the first client computing device. Each of the plurality of candidate profiles may be associated with a respective audio identification model. The interface may receive a second audio input signal from the second client computing device. The authentication component may generate a third identification score based on the first audio identification model and a fourth identification score based on the second audio identification model. The authentication component may select a profile associated with the first audio identification model based on a ranking of the third identification score and the fourth identification score and may update the first audio identification model based on the second audio input signal. Additionally or alternatively, the authentication component may generate a third audio identification model based on the second audio input signal. The interface may receive a second location of the first client computing device. The authentication component may determine that the second location of the first client computing device is outside the predetermined distance to the second client computing device and may merge the first audio identification model and the third audio identification model based on determining that the second location of the first client computing device is outside the predetermined distance of the second client computing device. The interface may transmit an authorization notification to the first client computing device. The authentication component may associate the first audio identification model of the first client computing device with the second client computing device based on receiving an approval message from the first client computing device responsive to the authorization notification.

Figure 4:
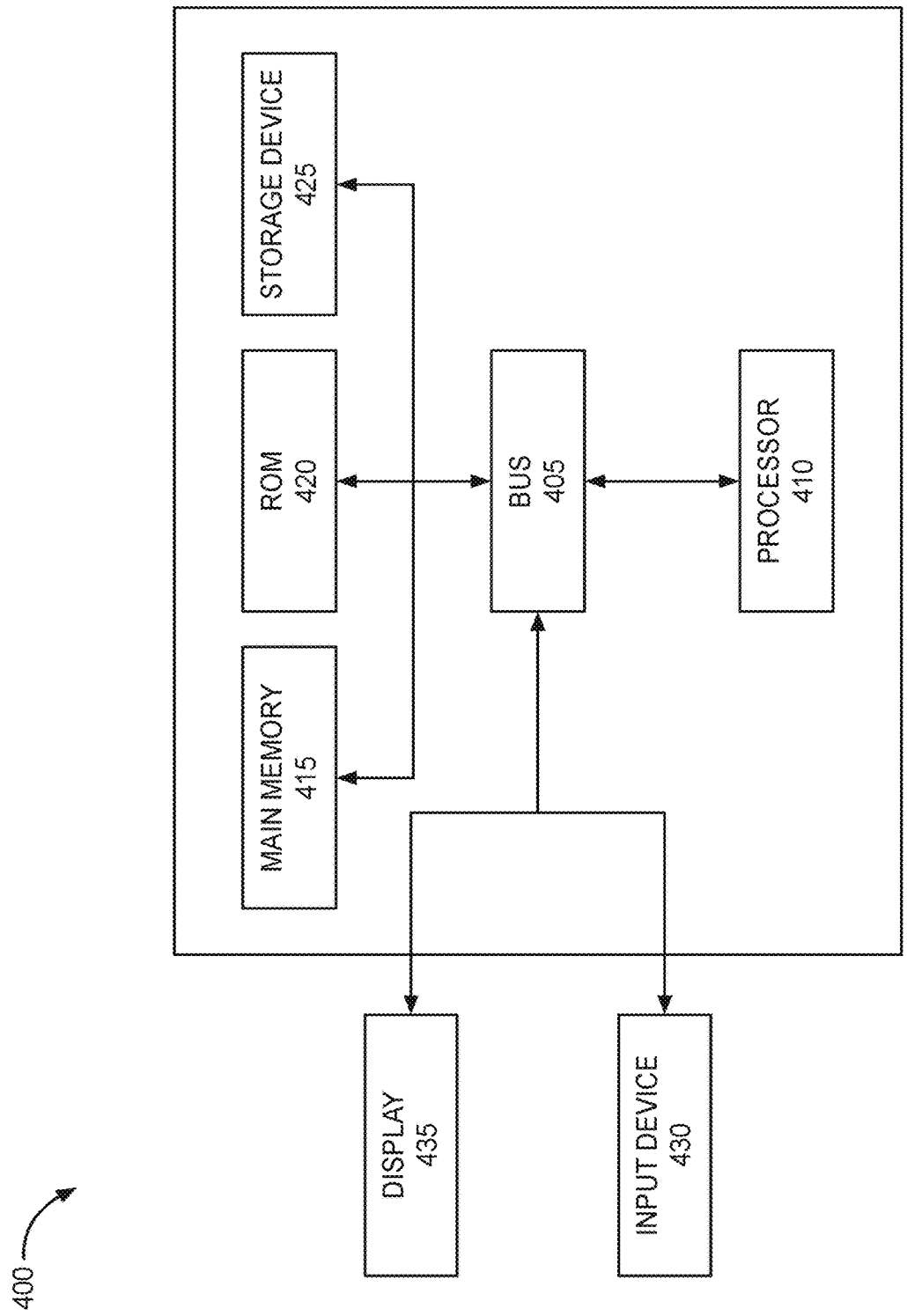
FIG. 4 is a block diagram illustrating a general architecture for a computer system that may be employed to implement elements of the systems and methods described and illustrated herein.

FIG. 4 is a block diagram of an example computer system 400. The computer system or computing device 400 can include or be used to implement the system 100 or its components such as the data processing system 102. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 122. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 122.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 104 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The direct action API 116, content selector component 118, authentication component 114, or NLP component 112 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such described herein can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client computing device (e.g., for purposes of displaying data to and receiving user input from a user interacting with the client computing device). Data generated at the client computing device (e.g., a result of the user interaction) can be received from the client computing device at the server (e.g., received by the data processing system 102 from the client computing device 104 or the content provider computing device 106).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112, the content selector component 118, or authentication component 114 can be a single component, app, program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A method implemented by one or more processors, the method comprising:
   detecting a network connection between a first client device associated with a first user and a second client device associated with a second user;
   in response to detecting the network connection between the first client device and the second client device:
      generating an authorization notification that requests authorization, from the first user, to share an audio identification model associated with the first client device with the second client device;
      causing the authorization notification to be provided for presentation to the first user via the first client device;
      determining, based on user input received from the first user responsive to the authorization notification, whether to share the audio identification model associated with the first client device with the second client device;
   in response to determining the first user authorizes sharing of the audio identification model associated with the first client device with the second client device:
      providing access, to the second client device, to the audio identification model associated with the first client device;
      determining whether one or more conditions for revoking access to the audio identification model are satisfied; and
   in response to determining that one or more of the conditions for revoking access to the audio identification model are satisfied:
      revoking the access, from the second client device, to the audio identification model associated with the first client device.

2. The method of claim 1, wherein the one or more conditions for revoking access to the audio identification model comprise one or more of: a temporal condition or a locational condition.

3. The method of claim 2, wherein determining whether one or more conditions for revoking access to the audio identification model are satisfied comprises:
   determining the temporal condition is satisfied based on determining a predetermined amount has lapsed subsequent to the first client device providing access, to the second client device, to the audio identification model associated with the first client device.

4. The method of claim 2, wherein determining whether one or more conditions for revoking access to the audio identification model are satisfied comprises:
   determining the locational condition is satisfied based on determining the first client device is beyond a predetermined distance of the second client device subsequent to the first client device providing access, to the second client device, to the audio identification model associated with the first client device.

5. The method of claim 2, wherein determining whether one or more conditions for revoking access to the audio identification model are satisfied comprises:
   determining the locational condition is satisfied based on detecting interruption of the network connection between the first client device and the second client device.

6. The method of claim 1, wherein providing access, to the second client device, to the audio identification model associated with the first client device comprises:
   transmitting, to the second client device via the network connection, the audio identification model associated with the first client device; and
   causing the second client device to utilize the audio identification model in processing input audio signals received at the client device.

7. The method of claim 1, wherein providing access, to the second client device, to the audio identification model associated with the first client device comprises:
   receiving, via the network connection, an input audio signal from the second client device;
   processing, using the audio identification model, the input audio signal to generate a first identification score for the first user; and
   transmitting, via the network connection, the first identification score for the first user to the second client device.

8. The method of claim 1, further comprising:
   receiving, via the network connection, an input audio signal;
   processing, using the audio identification model, the input audio signal to generate a first identification score for the first user;
   processing, using an additional audio identification model associated with the second user, the input audio signal to generate a second identification score for the second user; and determining, based on the first identification score and the second identification score, whether the first user or the second user provided a spoken utterance corresponding to the input audio signal.

9. The method of claim 1, wherein the authorization notification provided for presentation to the first user via the first client device is provided as one of: a push notification, a text message, an email message, or an application notification.

10. A system comprising:
one or more processors; and
memory storing instructions that, when executed, cause one or more of the processors to:
  determining a first user associated with a first client device was added to a group of users associated with a second client device;
  in response to determining the first user was added to the group of users:
    generating an authorization notification that requests authorization, from the first user, to share an audio identification model associated with the first client device with the second client device;
    causing the authorization notification to be provided for presentation to the first user via the first client device;
    determining, based on user input received from the first user responsive to the authorization notification, whether to share the audio identification model associated with the first client device with the second client device;
    in response to determining the first user authorizes sharing of the audio identification model associated with the first client device with the second client device:
      providing access, to the second client device, to the audio identification model associated with the first client device;
      determining whether one or more conditions for revoking access to the audio identification model are satisfied; and
      in response to determining that one or more of the conditions for revoking access to the audio identification model are satisfied:
        revoking the access, from the second client device, to the audio identification model associated with the first client device.

11. The system of claim 10, wherein the one or more conditions for revoking access to the audio identification model comprise one or more of: a temporal condition or a locational condition.

12. The system of claim 11, wherein the instructions to determine whether one or more conditions for revoking access to the audio identification model are satisfied comprise instructions to:
  determine the temporal condition is satisfied based on determining a predetermined amount has lapsed subsequent to the first client device providing access, to the second client device, to the audio identification model associated with the first client device.

13. The system of claim 11, wherein the instructions to determine whether one or more conditions for revoking access to the audio identification model are satisfied comprise instructions to:
  determine the locational condition is satisfied based on determining the first client device is beyond a predetermined distance of the second client device subsequent to the first client device providing access, to the second client device, to the audio identification model associated with the first client device.

14. The system of claim 10, wherein the instructions to provide access, to the second client device, to the audio identification model associated with the first client device comprise instructions to:
  transmit, via a network connection between the first client device and the second client device, the audio identification model associated with the first client device to the second client device; and
  cause the second client device to utilize the audio identification model in processing input audio signals received at the client device.

15. The system of claim 10, wherein the instructions to provide access, to the second client device, to the audio identification model associated with the first client device comprise instructions to:
  receive, via a network connection between the first client device and the second client device, an input audio signal from the second client device;
  process, using the audio identification model, the input audio signal to generate a first identification score for the first user; and
  transmit, via the network connection, the first identification score for the first user to the second client device.

16. The system of claim 10, wherein the instructions further comprise instruction to:
  receive, via a network connection between the first client device and the second client device, an input audio signal;
  process, using the audio identification model, the input audio signal to generate a first identification score for the first user;
  process, using an additional audio identification model associated with the second user, the input audio signal to generate a second identification score for the second user; and
  determine, based on the first identification score and the second identification score, whether the first user or the second user provided a spoken utterance corresponding to the input audio signal.

17. The system of claim 10, wherein the authorization notification provided for presentation to the first user via the first client device is provided as one of: a push notification, a text message, an email message, or an application notification.

18. A non-transitory computer-readable storage medium storing instructions that, when executed, cause one or more processors to:
  detect a network connection between a first client device associated with a first user and a second client device associated with a second user;
  in response to detecting the network connection between the first client device and the second client device:
    generate an authorization notification that requests authorization, from the first user, to share an audio identification model associated with the first client device with the second client device;
    cause the authorization notification to be provided for presentation to the first user via the first client device;
    determine, based on user input received from the first user responsive to the authorization notification, whether to share the audio identification model associated with the first client device with the second client device;

in response to determining the first user authorizes sharing of the audio identification model associated with the first client device with the second client device:
provide access, to the second client device, to the audio identification model associated with the first client device;

determine whether one or more conditions for revoking access to the audio identification model are satisfied; and in response to determining that one or more of the conditions for revoking access to the audio identification model are satisfied:
revoke the access, from the second client device, to the audio identification model associated with the first client device.

* * * * *